(12) United States Patent
Edwards et al.

(10) Patent No.: US 7,770,999 B2
(45) Date of Patent: Aug. 10, 2010

(54) SONIC LEAK TESTING ON INK DELIVERY SYSTEMS AND INK JET HEADS

(75) Inventors: Paul Andrew Edwards, Ypsilanti, MI (US); Frank Bruck, Ypsilanti, MI (US); John Hennessy, Grosse Pointe Park, MI (US)

(73) Assignee: Electronics for Imaging, Inc., Foster City, CA (US)

( * ) Notice: Subject to any disclaimer, the term of this patent is extended or adjusted under 35 U.S.C. 154(b) by 42 days.

(21) Appl. No.: 11/862,600

(22) Filed: Sep. 27, 2007

(65) Prior Publication Data
US 2008/0074460 A1 Mar. 27, 2008

Related U.S. Application Data

(60) Provisional application No. 60/847,655, filed on Sep. 27, 2006.

(51) Int. Cl.
*B41J 29/393* (2006.01)
(52) U.S. Cl. .................. 347/19; 347/5; 347/37
(58) Field of Classification Search .............. 73/40.5 A, 73/584, 587, 40.5; 381/320; 347/5, 7, 14, 347/19, 37
See application file for complete search history.

(56) References Cited

U.S. PATENT DOCUMENTS

| | | | |
|---|---|---|---|
| 3,571,514 A * | 3/1971 | Wruk | ............ 381/320 |
| 3,869,986 A | 3/1975 | Hubbard | |
| 4,465,800 A | 8/1984 | Bhatia | |
| 4,493,252 A | 1/1985 | Clark | |
| 4,803,119 A | 2/1989 | Duff et al. | |
| 5,104,448 A | 4/1992 | Kruse | |
| 5,154,761 A | 10/1992 | Cooke et al. | |
| 5,160,535 A | 11/1992 | Cooke et al. | |
| 5,376,169 A | 12/1994 | Hotomi et al. | |
| 5,393,331 A | 2/1995 | Loria et al. | |
| 5,417,113 A * | 5/1995 | Hartley | ............ 73/587 |
| 5,443,628 A | 8/1995 | Loria et al. | |
| 5,467,973 A | 11/1995 | Graushar et al. | |
| 5,510,415 A | 4/1996 | Zahrobsky et al. | |
| 5,565,143 A | 10/1996 | Chan | |
| 5,616,540 A | 4/1997 | Lithgow et al. | |
| 5,630,363 A | 5/1997 | Davis et al. | |
| 5,710,377 A * | 1/1998 | Youngquist et al. | ........ 73/584 |
| 5,725,985 A | 3/1998 | Nealey et al. | |
| 5,739,833 A | 4/1998 | Yamazaki et al. | |
| 5,985,079 A | 11/1999 | Ellison | |

(Continued)

FOREIGN PATENT DOCUMENTS

DE 10051088 4/2002

(Continued)

*Primary Examiner*—Lam S Nguyen
(74) *Attorney, Agent, or Firm*—Michael A. Glenn; Glenn Patent Group

(57) ABSTRACT

A method of detecting a leak in an ink delivery system comprises providing an ink delivery system having a plurality of pipes, wherein the ink delivery system could potentially have an ink leak producing an audible signal. The method further comprises providing an ultrasonic detector operable to detect the audible signal and actuating the ultrasonic detector to detect when the ink leak is present by detecting the presence of the audible signal. Finally, the method comprises outputting a signal when the audible signal is detected to alert a user.

6 Claims, 1 Drawing Sheet

U.S. PATENT DOCUMENTS

Figure 1:
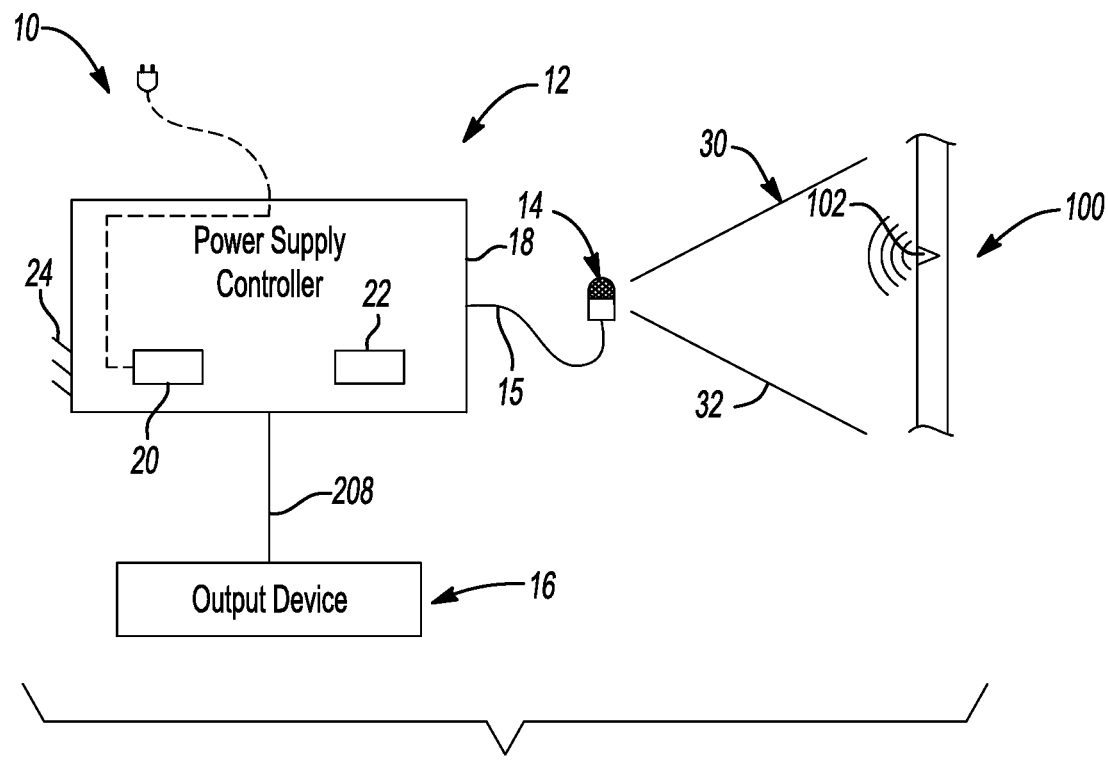

| | | | |
|---|---|---|---|
| 6,019,046 A | 2/2000 | Rodi et al. | |
| 6,048,914 A | 4/2000 | Goto et al. | |
| 6,113,679 A | 9/2000 | Adkins et al. | |
| 6,126,281 A | 10/2000 | Shimoda et al. | |
| 6,231,654 B1 | 5/2001 | Elwakil | |
| 6,247,353 B1 * | 6/2001 | Battenberg et al. | 73/40.5 A |
| 6,254,218 B1 | 7/2001 | Suzuki et al. | |
| 6,276,273 B1 | 8/2001 | Aurenty et al. | |
| 6,328,418 B1 | 12/2001 | Yamada et al. | |
| 6,346,353 B1 | 2/2002 | Wang et al. | |
| 6,413,590 B1 | 7/2002 | Anderson et al. | |
| 6,443,568 B1 | 9/2002 | Askeland et al. | |
| 6,455,136 B1 | 9/2002 | Okajima et al. | |
| 6,523,949 B1 | 2/2003 | Ewert | |
| 6,530,645 B2 | 3/2003 | Haflinger | |
| 6,533,379 B1 | 3/2003 | Kubota et al. | |
| 6,575,558 B1 | 6/2003 | Grose et al. | |
| 6,585,369 B1 | 7/2003 | Sievert et al. | |
| 6,588,889 B2 | 7/2003 | Jeanmaire | |
| 6,675,646 B2 | 1/2004 | Nishihara et al. | |
| 6,725,705 B1 * | 4/2004 | Huebler et al. | 73/40.5 A |
| 2001/0007464 A1 | 7/2001 | Kellett | |
| 2002/0029723 A1 | 3/2002 | Fox et al. | |
| 2002/0109738 A1 | 8/2002 | Ozawa | |
| 2002/0183419 A1 | 12/2002 | Lin et al. | |
| 2003/0081061 A1 | 5/2003 | Gunther et al. | |
| 2003/0143346 A1 | 7/2003 | Yoshizawa et al. | |
| 2003/0214554 A1 | 11/2003 | Tschida | |
| 2003/0218663 A1 | 11/2003 | Baxter et al. | |
| 2003/0224150 A1 | 12/2003 | Ludwig et al. | |
| 2004/0023087 A1 | 2/2004 | Redmond | |
| 2004/0080595 A1 | 4/2004 | Taguchi et al. | |
| 2004/0090866 A1 | 5/2004 | Goodman et al. | |
| 2004/0121173 A1 | 6/2004 | St. Arnauld | |
| 2004/0179062 A1 | 9/2004 | Rai et al. | |
| 2004/0201661 A1 | 10/2004 | Li | |
| 2005/0129879 A1 | 6/2005 | Bodis | |
| 2005/0189066 A1 | 9/2005 | Look et al. | |
| 2005/0264622 A1 | 12/2005 | Silverbrook et al. | |
| 2006/0050286 A1 | 3/2006 | Silverbrook et al. | |
| 2006/0092221 A1 | 5/2006 | Jeong | |

FOREIGN PATENT DOCUMENTS

| | | |
|---|---|---|
| EP | 0628956 | 12/1994 |
| EP | 963854 A2 | 12/1999 |
| EP | 1293344 | 3/2003 |
| EP | 1308491 | 5/2003 |
| EP | 1367101 A1 | 12/2003 |
| JP | 09071040 A | 3/1997 |
| JP | 2004/034675 | 2/2004 |
| WO | WO-01/45957 | 6/2001 |
| WO | WO-02/055619 A1 | 7/2002 |
| WO | WO-02/06294 | 8/2002 |
| WO | WO-02062894 A1 | 8/2002 |
| WO | WO-2004/022353 | 3/2004 |
| WO | WO-2004/043702 | 5/2004 |

* cited by examiner

SONIC LEAK TESTING ON INK DELIVERY SYSTEMS AND INK JET HEADS

CROSS-REFERENCE TO RELATED APPLICATIONS

This application claims the benefit of U.S. Provisional Application No. 60/847,655 filed on Sep. 27, 2006. The disclosure of the above application is incorporated herein by reference.

FIELD

The present disclosure relates to ink jet printers and, more particularly, relates to sonic leak testing on ink delivery system and ink jet heads.

BACKGROUND

The statements in this section merely provide background information related to the present disclosure and may not constitute prior art.

Ink jet print systems tend to be very sensitive to piping leaks. Ink jet print systems typically have internal ink delivery systems that are made up of ink lines, manifolds, valves, bulkhead fittings, fluid pumps, gages, and other fittings necessary to deliver and control ink at the ink jet heads. Leaks in the piping can cause ink spills and pressure fluctuations that have a negative effect on system performance. However, the most severe problem is caused by the smallest leaks, as they can allow air bubbles back into the ink stream, causing print heads to perform inconsistently.

Large leaks in ink delivery systems can be identified by sight, sound, or feel. The application of soapy water to the exterior of the ink lines and fittings can detect smaller leaks. However, there are leaks that are too small to be detected with the above methods, and these smallest leaks are the most important to eliminate because the quantity of leaks can be high in a complex ink system, they would otherwise go unnoticed because of their small size, and they allow air into the ink system, which causes print heads to operate erratically.

SUMMARY

According to the principles of the present teachings, a method is provided that is superior to those methods previously used in that it allows the detection of significantly smaller leaks, can be done during printer build phases or at any time in a print system's life cycle, can pinpoint a leak to an exact fitting or sealing surface, and can detect leaks in either pressurized or vacuumed ink delivery systems. Fittings can be leak checked under pressure and confirmed leak free under vacuum, giving higher confidence in overall system integrity. Finally, the device according to the present teachings can be permanently mounted on a print machine to continually sense system leaks, reporting or signaling to the operator when a leak is detected.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
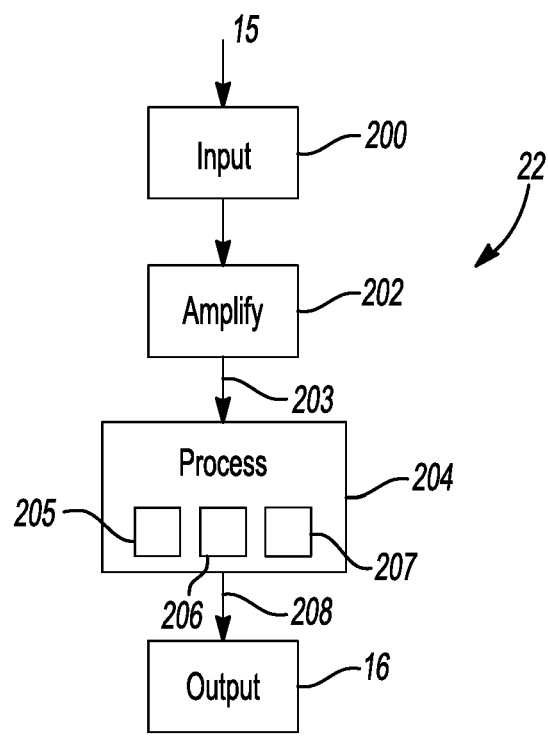

FIG. 1 is a schematic view illustrating an ultrasonic leak detector according to some embodiments of the present teachings; and FIG. 2 is a flowchart showing a processing circuitry according to some embodiments of the present teachings.

DETAILED DESCRIPTION

The following description is merely exemplary in nature and is not intended to limit the present disclosure, application, or uses.

In some embodiments, the present teachings employ ultrasonic leak detectors to search for piping leaks in an ink delivery system. The smallest leaks are the most important to eliminate as air entrapment into the ink stream creates numerous print difficulties. The ultrasonic leak detector contains a very sensitive microphone that is precisely tuned to the sound frequencies common when pressurized air escapes from containment. The leak detector can "hear" the sound of pressure and vacuum leaks and gives the operator positive feedback when a leak is detected.

With reference to FIGS. 1 and 2, an ultrasonic leak detector 10 is disclosed for ultrasonic detection of ink leaks 102 (i.e. audible signals) in an ink jet system 100 (partially shown in FIG. 1). Ultrasonic leak detector 10 can comprise a power supply controller 12 operably coupled to a leak detection microphone 14. Leak detection microphone 14 is operable to receive a sound wave input (i.e. audible signals from ink leaks 102) and generate a corresponding electrical signal 15. The corresponding electrical signal 15 is then fed to power supply controller 12 for processing as will be described herein. In some embodiments, power supply controller 12 can then output an operator feedback signal 208 to an output device 16 to alert a user.

Still referring to FIG. 1, power supply controller 12 can comprise a housing 18 containing a power supply 20, processing circuitry 22, and/or operator controls 24. It should be understood that power supply 20 can include a battery supply, an alternating current supply, and/or a renewable energy supply.

In some embodiments, leak detection microphone 14 can comprise a highly sensitive microphone that is specifically tuned for leak detection at a known frequency range. However, it should be understood that this known frequency range is dependent upon the specific configuration and equipment used in the ink jet system 100 and, thus, should be selected based on the specific configuration for optimized performance. In some embodiments, leak detection microphone 14 can comprise a ceramic, magnetic, or other advanced microphone technology to convert the sonic vibrations generated from the leak to the electrical signal 15.

As seen in FIG. 1, ultrasonic leak detector 10 can further comprise a sound channeling system 30 for directing sound from the leak toward leak detection microphone 14. This can be helpful to permit detection of low volume (amplitude) leaks. The sound channeling system 30 can comprise one or more baffles 32 for directing the sound toward leak detection microphone 14. It should be appreciated that other configurations can also be used.

To further enhance the utility of the present disclosure, signal noise can be eliminated, or at least minimized, for improved detection results. In order to filter out any remaining signal noise or unwanted sonic frequencies, the electrical signal 15 from leak detection microphone 14 can be processed according to one of a number of methods. For example, as illustrated in FIG. 2, the electrical signal 15 from leak detection microphone 14 can be input to processing circuitry 22 at method step 200. The signal can then be amplified, if necessary, at step 202 to achieve signal attributes conducive to later processing and/or detection. This amplified signal, generally referenced as 203, can be processed according to processing step 204. In some embodiments, processing step 204 can include passage of amplified signal 203 through a low pass electronic filter 205 for attenuation of low-band frequencies, a high pass electronic filter 206 for attenuation of high-band frequencies, and/or an electronic algorithm 207 to attenuate the unwanted frequencies from being processed. It should be understood that electronic algorithm 207 could also be used to amplify and attenuate electrical signal 15 in a single step. Electronic algorithms 207 may also be used to identify those frequencies associated with leaks. The presence and/or absence of a leak can be output as an operator feedback signal 208 to output device 16.

In some embodiments, output device 16 can comprise a visual device, such as a display monitor or light; an audible device, such as a speaker system; and/or a tactile device, such as a vibration system. It should be appreciated, however, that output device 16 can be any one of a number of devices used to signal or alert an operator of a condition.

During testing, ultrasonic leak detector 10 is positioned such that leak detection microphone 14 is in close proximity to the fittings being tested. In some embodiments, a vacuum can be created in the line to be test to accentuate the audible signal of leak 102. Ultrasonic leak detector 10 helps the operator detect and zone in on the leak through its positive feedback features, showing more visual indicators or sound volume as the leak is approached. The leak can then be found, corrected and retested, under air pressure or vacuum or both in a sequence. Use of the principles of the present teachings provides the user with a leak free ink system that will give optimized print performance.

The present teachings are best used during the building phase of an ink delivery system or printing machine, but are also useful at any time during a print machine's or ink jet system's life cycle. The detector can be placed permanently onto the print machine and could continuously "listen" or monitor for air or vacuum leaks.

What is claimed is:

1. An ultrasonic leak detector comprising:
   a leak detection microphone;
   a sound channeling system that is positionable relative to said leak detection microphone for directing an audible signal from a leak in an ink delivery system to the leak detection microphone, wherein the sound channeling system comprises a plurality of baffles, the baffles being wider at the side closest to the leak than the side closest to the leak detection microphone;
   wherein the leak detection microphone operable to receive the directed audible signal and output an electrical signal;
   an amplifier for amplifying the electrical signal;
   a processing circuit for receiving the amplified electrical signal comprising:
      a low pass filter for attenuating low-band frequencies from the amplified electrical signal; and
      a high pass filter for attenuating high-band frequencies from the amplified electrical signal;
      wherein the processing circuit applies an electronic algorithm to the amplified electrical signal to attenuate unwanted frequencies, the processing circuit generating an operator feedback signal; and
   an output device for receiving the operator feedback signal and alerting a user.

2. The ultrasonic leak detector according to claim 1 wherein the leak detection microphone is a ceramic microphone.

3. The ultrasonic leak detector according to claim 1 wherein the leak detection microphone is a magnetic microphone.

4. The ultrasonic leak detector according to claim 1 wherein the output device is an audible device.

5. The ultrasonic leak detector according to claim 1 wherein the output device is a visual device.

6. The ultrasonic leak detector according to claim 1 wherein the output device is a tactile device.

* * * * *